(12) United States Patent
Root

(10) Patent No.: US 8,634,943 B2
(45) Date of Patent: Jan. 21, 2014

(54) INTERACTIVE SPORTS-THEMED GAME

(75) Inventor: John Root, Upper Darby, PA (US)

(73) Assignee: Bleacher League Entertainment Inc., Upper Darby, PA (US)

( * ) Notice: Subject to any disclaimer, the term of this patent is extended or adjusted under 35 U.S.C. 154(b) by 230 days.

(21) Appl. No.: 12/462,906

(22) Filed: Aug. 11, 2009

(65) Prior Publication Data

US 2010/0035672 A1 Feb. 11, 2010

Related U.S. Application Data

(63) Continuation-in-part of application No. 12/150,723, filed on Apr. 30, 2008, now Pat. No. 7,909,332.

(51) Int. Cl.
*G06F 19/00* (2011.01)
*A63F 9/00* (2006.01)
*A63F 13/00* (2006.01)

(52) U.S. Cl.
USPC .......... 700/92; 463/2; 463/3; 463/42; 700/90; 700/91; 700/93

(58) Field of Classification Search
USPC ................................ 463/42, 2, 3; 700/90–93
See application file for complete search history.

(56) References Cited

U.S. PATENT DOCUMENTS

| | | | | |
|---|---|---|---|---|
| 4,592,546 A * | 6/1986 | Fascenda et al. | ............... | 463/29 |
| 4,868,772 A * | 9/1989 | Collard | ........................... | 700/91 |
| 6,041,266 A * | 3/2000 | Nickerson | ....................... | 700/92 |
| 6,042,492 A * | 3/2000 | Baum | ........................... | 473/453 |
| 6,112,128 A * | 8/2000 | Steinmetz | ........................ | 700/91 |
| 6,293,868 B1 * | 9/2001 | Bernard | .......................... | 463/42 |
| 6,325,721 B1 * | 12/2001 | Miyamoto et al. | .............. | 463/40 |
| 6,394,895 B1 * | 5/2002 | Mino | .................................. | 463/3 |
| 6,554,709 B1 * | 4/2003 | Brenner et al. | ................. | 463/42 |
| 7,909,332 B2 * | 3/2011 | Root | ............................. | 273/461 |
| 7,946,960 B2 * | 5/2011 | Vitolo et al. | ....................... | 482/8 |
| 8,092,306 B2 * | 1/2012 | Root | ............................... | 463/40 |
| 8,308,615 B2 * | 11/2012 | Vitolo et al. | ....................... | 482/8 |
| 8,348,276 B2 * | 1/2013 | Brennan | ................... | 273/118 R |
| 8,531,462 B1 * | 9/2013 | Tillman et al. | ................. | 345/473 |
| 2002/0034980 A1 * | 3/2002 | Lemmons et al. | .............. | 463/40 |
| 2002/0044045 A1 * | 4/2002 | Crookham et al. | ........ | 340/323 R |
| 2002/0068633 A1 * | 6/2002 | Schlaifer | .......................... | 463/43 |
| 2002/0107059 A1 * | 8/2002 | Katayama | ......................... | 463/4 |
| 2002/0115489 A1 * | 8/2002 | Jordan et al. | ..................... | 463/42 |
| 2002/0126318 A1 * | 9/2002 | Katayama | ..................... | 358/402 |
| 2003/0157976 A1 * | 8/2003 | Simon et al. | ...................... | 463/1 |
| 2003/0168811 A1 * | 9/2003 | Gerson et al. | ................. | 273/372 |
| 2004/0005926 A1 * | 1/2004 | LeFroy | .............................. | 463/42 |
| 2004/0229671 A1 * | 11/2004 | Stronach et al. | ................. | 463/6 |
| 2004/0235542 A1 * | 11/2004 | Stronach et al. | ................. | 463/6 |
| 2005/0064937 A1 * | 3/2005 | Ballman | ......................... | 463/40 |
| 2005/0143198 A1 * | 6/2005 | Charge | .......................... | 473/422 |
| 2005/0227757 A1 * | 10/2005 | Simon | ............................. | 463/25 |

(Continued)

*Primary Examiner* — William H McCulloch, Jr.

(74) *Attorney, Agent, or Firm* — Ryder, Lu, Mazzeo & Konieczny LLC

(57) ABSTRACT

A method and system for playing a virtual game is disclosed. The virtual game is associated with a real game, such as a baseball or golf game. Users play the virtual game which is based on events in a real game that is followed by the users simultaneously as they play the virtual game. In one embodiment, the real game is a baseball game. In another embodiment, the real game is a golf game. A server communicates with clients to allow multiple users to compete in the virtual game via the use of client devices.

1 Claim, 11 Drawing Sheets

(56) References Cited

U.S. PATENT DOCUMENTS

| | | |
|---|---|---|
| 2005/0239551 A1* | 10/2005 | Griswold et al. .............. 463/42 |
| 2005/0261043 A1* | 11/2005 | Slade ............... 463/1 |
| 2006/0046807 A1* | 3/2006 | Sanchez .............. 463/9 |
| 2006/0089199 A1* | 4/2006 | Jordan et al. ................. 463/42 |
| 2006/0094506 A1* | 5/2006 | Tarter et al. ................... 463/42 |
| 2006/0183547 A1* | 8/2006 | McMonigle ................. 463/40 |
| 2006/0192334 A1* | 8/2006 | Wittwer ................ 273/277 |
| 2007/0004516 A1* | 1/2007 | Jordan et al. ................. 463/42 |
| 2007/0021165 A1* | 1/2007 | Ma et al. .............. 463/1 |
| 2007/0082725 A1* | 4/2007 | Low et al. ................ 463/16 |
| 2007/0102877 A1* | 5/2007 | Personius et al. .......... 273/138.2 |
| 2008/0227517 A1* | 9/2008 | O'Neal et al. ................. 463/16 |
| 2008/0274815 A1* | 11/2008 | Root ............... 463/48 |
| 2009/0186679 A1* | 7/2009 | Irvine et al. ................. 463/16 |
| 2010/0035672 A1* | 2/2010 | Root ............... 463/2 |
| 2010/0279754 A1* | 11/2010 | Tanenbaum .............. 463/3 |
| 2011/0092274 A1* | 4/2011 | Low et al. ................ 463/25 |
| 2011/0183735 A1* | 7/2011 | Root ............... 463/4 |

* cited by examiner

INTERACTIVE SPORTS-THEMED GAME

CROSS REFERENCE TO RELATED APPLICATIONS

This application is a continuation-in-part of U.S. patent application Ser. No. 12/150,723, filed Apr. 30, 2008 now U.S. Pat. No. 7,909,332.

FIELD OF THE INVENTION

The present invention relates generally to games. More particularly, the present invention pertains to game involving predicting the outcome of a live sporting event.

BACKGROUND

Activities based on predicting the outcome of sporting events are popular in today's culture. The motivation for these activities may include gambling, but may also include general amusement and entertainment purposes. Sporting events generate revenue by various means, such as ticket sales, concession sales (e.g. food and beverages), and advertising, among others. An activity that promotes the attendance and/or receiving broadcasts of live sporting events can add value to advertising, especially towards the latter parts of a sporting event. In many cases, if a sporting event turns out to be a one-sided "blowout," attendance and the number of viewers may plummet, thereby decreasing the effect of advertising. Therefore, it is desirable to provide an activity that promotes an audience engagement in a sporting event, regardless of the outcome of the event itself.

SUMMARY OF THE INVENTION

The main concept of the game of the present invention is to increase the fan's involvement in a live sporting event. The game of the present invention provides each player the opportunity of becoming interactive with each play of the real game. Beyond simply entertainment, the game of the present invention serves to keep fans in the seats or watching the game on television, since they are involved in every play of the real game. Unlike typical "fantasy" games that depend on the players of the fantasy game to select real players that perform well, the outcome of the game of the present invention is directly related to knowledge of the game, and is not dependent on good performance from a particular subset of athletes.

BRIEF DESCRIPTION OF THE DRAWINGS

In the drawings accompanying the description that follows, often both reference numerals and legends (labels, text descriptions) may be used to identify elements. If legends are provided, they are intended merely as an aid to the reader, and should not in any way be interpreted as limiting.

DETAILED DESCRIPTION

In the ensuing description, the terms "real game" or "live game" refer to the live sporting event of which the events are being predicted. The term "virtual game" pertains to the interactive sports-themed game of the present invention. The term "user" pertains to a person playing a "virtual game." It is to be understood that, unless specifically stated to be otherwise, the term "player" in the context of the virtual game, may refer to a single person, or group of people. The term "event" pertains to a particular "contest" within a game, such as a pitcher facing a batter in baseball, or a golfer playing a hole on a golf course. The term "result" or "outcome" as it pertains to a "real game" refers to a play of the live sporting event (e.g. a "triple" in baseball, or an "interception" in football).

The basic concept of play of the virtual game is that a user is presented multiple possible outcomes of an event, and selects a subset of those possible outcomes prior to the event transpiring. Upon completion of the event, the subset of outcomes selected by the user is compared with the result of the transpired event. The user is awarded points if the result of the transpired event matches one of the events in the subset of outcomes selected by the user.

In one embodiment of the present invention, a user plays the virtual game on a mobile client, such as a mobile phone. In another embodiment of the present invention, a user plays the virtual game on a television, or television set top box. In yet another embodiment of the present invention, a PC (personal computer) client is used.

Figure 1:
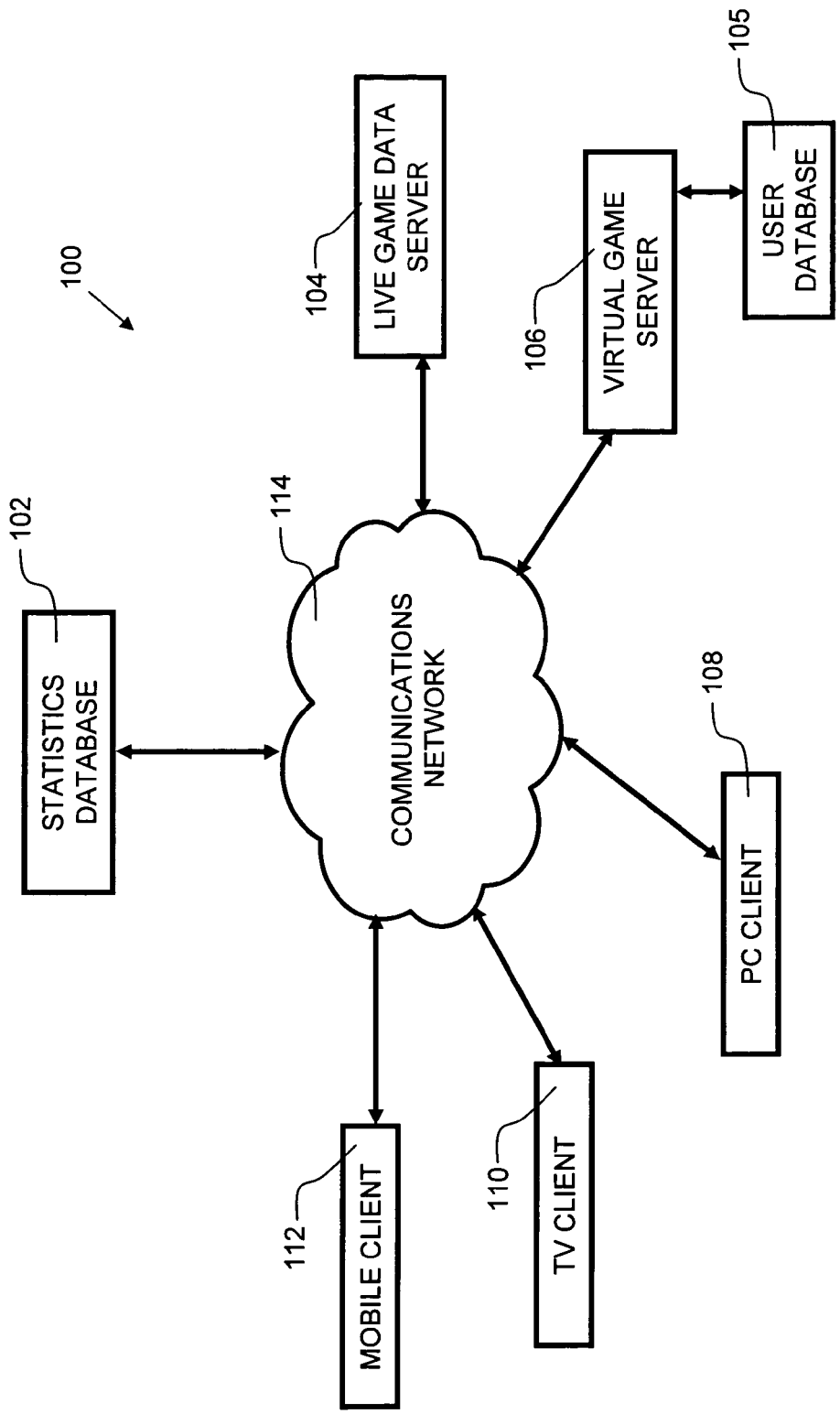
FIGS. 1-4 show block diagrams of systems in accordance with various embodiments of the present invention.

FIG. 1 shows a block diagram of a system 100 in accordance with an embodiment of the present invention. System 100 comprises a statistics database 102, live game data server 104, virtual game server 106, and user database 105. While each database and server is indicated as a separate entity, those skilled in the art will recognize that the various server and database functions may be contained within a single computer, or distributed over a plurality of computers, without departing from the scope and purpose of the present invention.

Statistics database 102 contains current data on players of the real game. For example, in the case of a virtual game based on a major league baseball game, the statistics database comprises current baseball statistics for major league players. Such statistics may include, but are not limited to, batting average, ERA, slugging percentage, on base percentage, RBIs, number of walks, number of each category of hit, and number of strikeouts, to name a few. The statistics may be further categorized according to type of pitcher or hitter faced (e.g. left handed, right handed, etc. . . . ), or categorized according to a particular matchup (e.g. the batting average of a particular hitter when facing a particular pitcher).

Live game data server 104 provides the events of a real game in real time. The live game feed data is provided by a content provider in a computer-readable format, such as XML data. Live game feed data is currently known in the art. Examples of such services include "Game Channel" by YAHOO (Sunnyvale, Calif.). The live data includes the current contest (e.g. which batter is facing which pitcher), as well as the score, and time remaining (where applicable). In the case of baseball, the current inning, and number of outs are provided.

Virtual game server 106 aggregates information from statistics database 102 and live game data server 104 and presents data to one or more clients (108, 110, and 112) via communications network 114. In one embodiment, communications network 114 comprises the Internet. In one embodiment, virtual game server stores data pertaining to each user (player of the virtual game) in user database 105. Data stored in user database 105 may include, but is not limited to, user name, user e-mail address, user phone number, user score, and user friends (other players of the virtual game). Other virtual game preferences may also be stored in user database 105.

Mobile client 112, TV client 110, and PC client 108 are virtual game clients that (generally referred to as "clients") provide an interface for the user to play the virtual game while following along with the real game. This encourages more involvement in watching the real game, even when the score of the real game may not be that close. By keeping fans engaged in the real game for a longer period, effectiveness of advertising during the real game is potentially improved, especially in the case of a real game where the score is not close. This is because users interested in the virtual game will continue to watch the real game, even if the eventual outcome of the real game is already surmised.

PC client 108 comprises a personal computer such as a desktop, laptop, or netbook, for example. In one embodiment, the user accesses a website via a browser to log on, and play the virtual game. TV Client 110 may be integrated into a digital television, or alternatively, may reside as an application in a digital television set top box (STB). Mobile client 112 is preferably a mobile telephone such as a so-called "smart phone" such as an iPhone, which is produced by APPLE, Inc., of Cupertino, Calif. In the case of a mobile client, the communication between the mobile client 112 and the virtual game server 106 may comprise use of a cellular network to communicate with the Internet.

The virtual game server 106 is the heart of the "backend" processing. It receives login data from a user on a client, and checks credentials within the user database 105. When the credentials have been validated, user preferences are then retrieved. These preferences may include, but are not limited to, position of various user interface elements, font sizes and styles, and a list of other players that the user can "play along with." The user selects a live game to use for predicting outcomes. The virtual game server then retrieves the appropriate live game data from the live game data server 104. The live game data includes participants in a particular contest (e.g. a particular batter and pitcher in a baseball game). The virtual game server then retrieves appropriate statistics for the participants from the statistics database 102. Using the statistics from statistics database 102, the virtual game server 106 generates point values for each possible outcome based on likelihood of occurrence, and presents the choices to the user on a client. In one embodiment, the virtual game server 106 provides data via HTTP to the client. The data may comprise HTML pages, XML data, or other suitable formats.

Once the user chooses one or more possible outcomes, and performs a "play" action via the user interface of a client (108, 110, or 112), the client transmits the user's outcome choices to the virtual game server 106. Once the actual event transpires, as indicated by updated data from live game data server 104, the virtual game server 106 then compares the actual outcome with those selected by the user, and awards the user the corresponding number of points, based on the generated point values for each outcome. The virtual game server 106 then posts a status update to all subscribed clients to reflect the change in the user's current score and success percentage.

Figure 2:
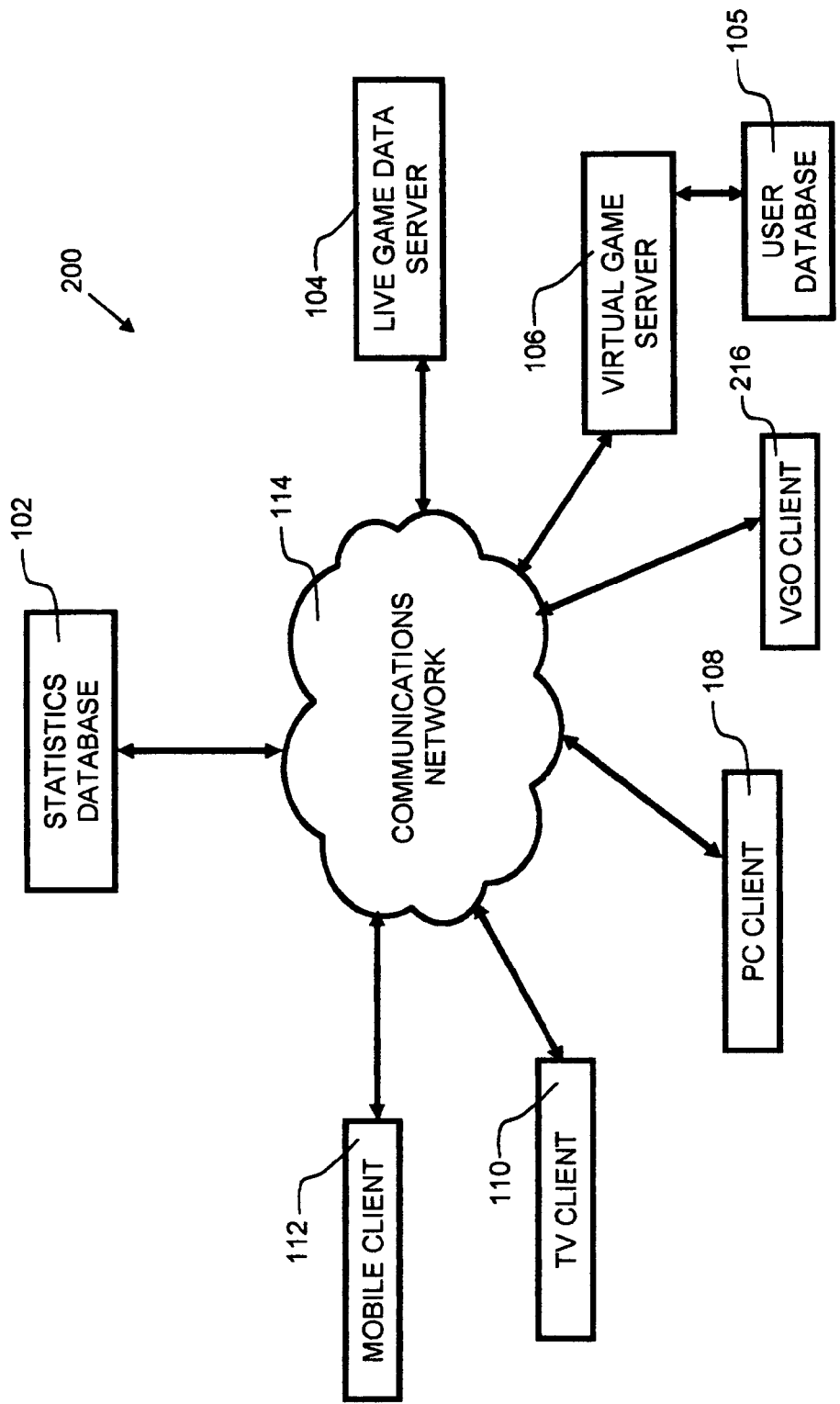

FIG. 2 shows a block diagram of a system 200 in accordance with an additional embodiment of the present invention. System 200 is similar to system 100, but further comprises a Virtual Game Official (VGO) client 216. The VGO client supports a virtual game official, which is a live person who officiates the virtual game. During play, the VGO watches the live game, and updates various parameters according to what is observed in the live game. Examples of things the VGO can control include, but are not limited to, the available outcomes presented to the user for a given contest, and the opening and closing of the prediction window for a contest. The prediction window is defined as the period of time during which a user is permitted to make a prediction for a given contest. A contest is defined as an event involving one or more live game players. Examples of an event include a pitcher-hitter match-up, or a golfer attempting to play a particular hole on a golf course. There is flexibility in the rules of the virtual game. In one embodiment pertaining to baseball, the prediction window is opened when the prior contest starts, and closes when the current contest starts. In that embodiment, virtual game players must make their predictions prior to the start of the contest. In one embodiment, the start of the contest is defined as the point when the pitcher releases the first pitch to a batter for a particular at bat. The VGO can open and close the windows by executing commands on the VGO client 216 which direct the Virtual Game Server 106 to control the virtual game player's clients (108, 110, 112). The VGO can also respond to last-minute lineup changes to cancel a contest that currently has an open prediction window, and replace it with a new contest. Examples of this include pitcher and/or batter substitutions that frequently occur in baseball games. In another embodiment, the prediction window is always open, and predictions on the current contest may be made at any time. This mode of play is suited for a casual, non-competitive environment.

Figure 3:
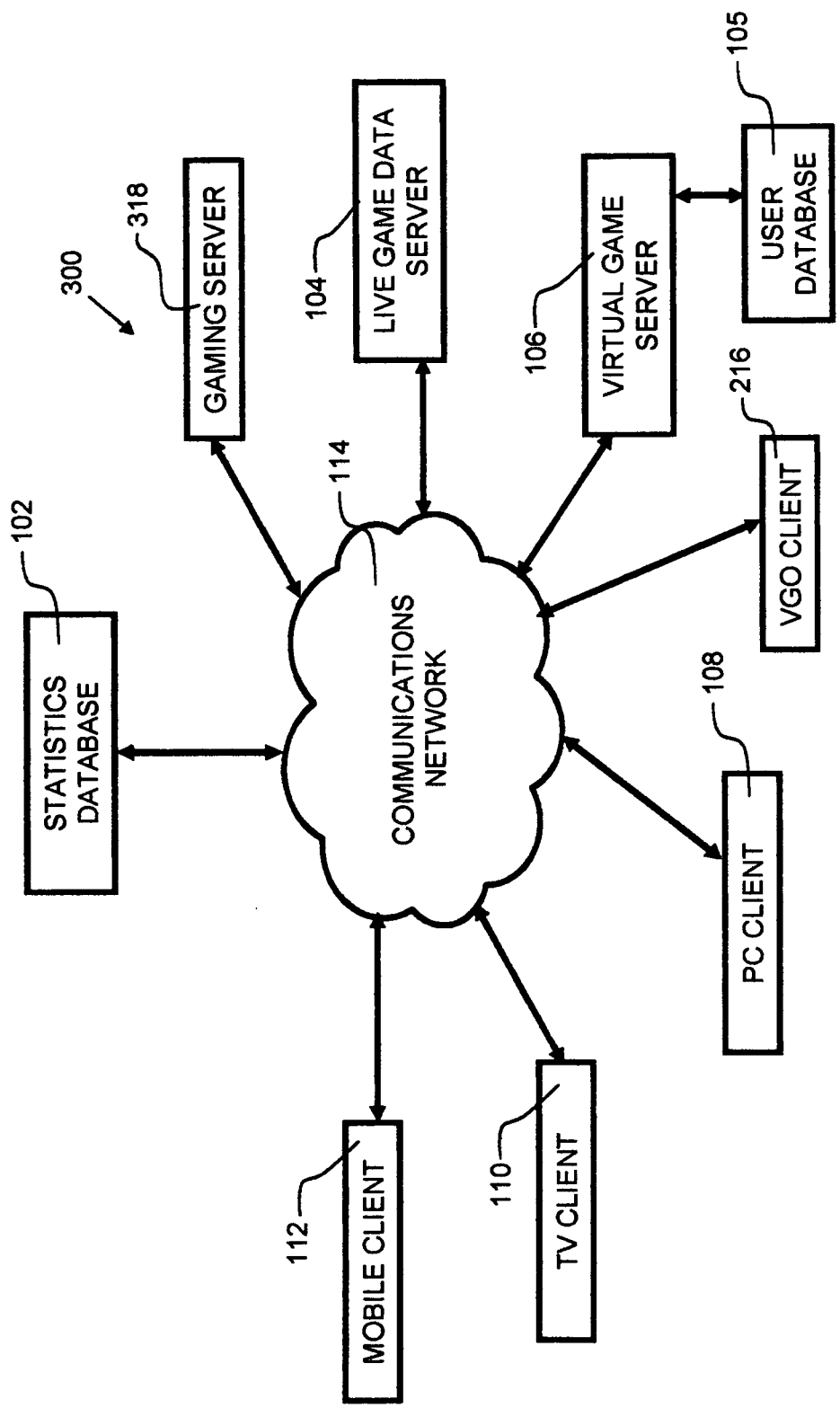

FIG. 3 shows a block diagram of a system 300 in accordance with an additional embodiment of the present invention. System 300 is similar to system 200, but further comprises a gaming server 318. The purpose of the gaming server 318 is to provide control for live gambling on virtual game results. Monies or prizes may be awarded on points scored in the virtual game, or on a contest-by-contest basis. In the contest-by-contest embodiment, users have an opportunity to place a wager prior to the start of a contest, and win if the actual outcome of the contest matches one of the outcomes the user had chosen. The amount won can depend on the number of points awarded for a particular correctly chosen outcome. The number of points awarded for a particular outcome is calculated by the virtual game server 106, based on data from the live game data server 104, and the statistics database 102. For example, for a given player, the number of points awarded for a particular outcome may be calculated by:

$$P = S - [INT]S*X/T$$

Where P is the number of points, S is a scale factor, and X is the number of times a player achieved a particular outcome (e.g. a single, double, walk, etc. . . . ), and T is the total number of trips to the plate (at bats). Therefore, X/T is a success ratio, and by subtracting the success ratio from a scale factor, a point value is calculated. For example, if S is 10, X, for a single, is 14, and T is 33, then P is calculated as:

$$P = 10 - [INT]10*14/33 = 10 - [INT]4.2424 = 10 - 4 = 6$$

Therefore, for that particular player, the points awarded for a single is 6. As can be seen, the higher percentage of singles a player gets, the fewer points are awarded for correctly guessing that outcome. Other metrics that may be used to calculate point values include, but are not limited to, slugging percentage (SLG), on base percentage (OBP), and on base plus slugging (OPS).

The point values for each possible outcome are transmitted from the virtual game server 106 to the gaming server 318. The gaming server 318 handles transactions and accounts for the bettors, and an enables separate business organizations to operate the virtual game network, and the gambling operation. In one embodiment, communications network 114 may be a private network (as opposed to the Internet), and all the virtual player clients may comprise TV clients 110 and PC clients 108. By eliminating mobile clients and using a private network, it facilitates constraining virtual game play to occur in a specific jurisdiction. An example is to confine play to within hotel rooms at a particular hotel in Las Vegas Nev., or other jurisdiction where sports-betting is legal and preventing wagering on the virtual game from outside of the desired jurisdiction. Another embodiment includes mobile clients, and utilizes location reporting information within the mobile client (e.g., the GPS within a mobile phone) to determine if the mobile client is within the correct jurisdiction.

Figure 4:
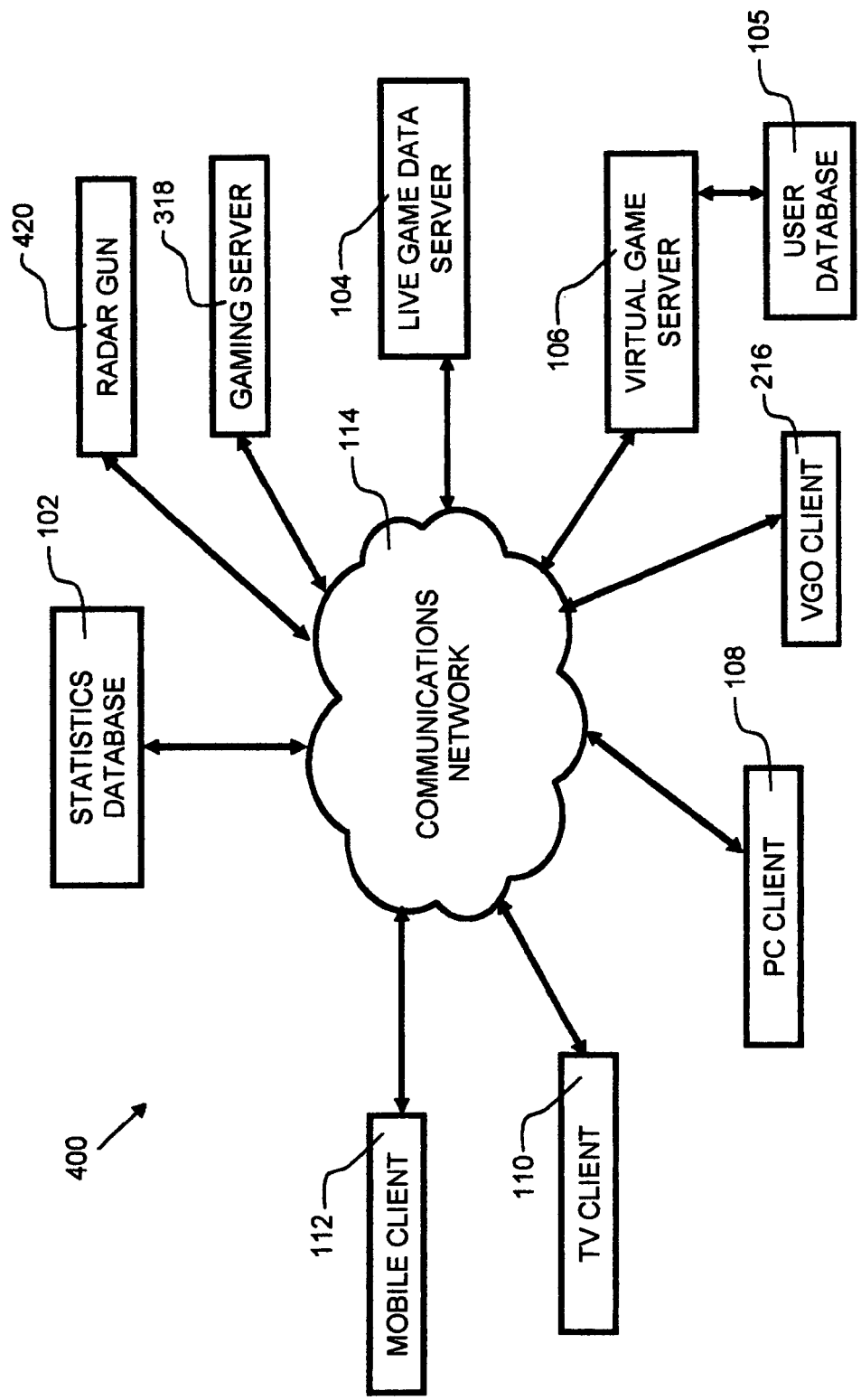

FIG. 4 shows a block diagram of a system 400 in accordance with an additional embodiment of the present invention. System 400 is similar to system 300, but further comprises a radar gun 420 which is configured to communicate to virtual game server 106 via communications network 114. In this embodiment, the closing of the prediction window is performed automatically by radar gun 420. The prediction window for a given contest $C_x$ opens when contest $C_{x-1}$ ends. For example, if contest $C_{x-1}$ was ended by a fly out, then as soon as the ball was caught, the VGO would open the prediction window for context $C_x$ via VGO client 216, which sends instructions to virtual game server 106, which in turn sends commands to clients (108, 110, 112) to indicate the open prediction window for contest $C_x$ to the virtual game players. In this embodiment, instead of having the VGO close the window manually by observing when the first pitch of an at bat was thrown, the radar gun 420 sends a "pitch thrown" event to the virtual game server once the pitch is detected, and the virtual game server 106 closes the prediction window in response to the pitch thrown event. Various produced models of radar gun may be suitable for radar gun 420. For example the SR3600 by SPORTS RADAR LTD of Homosassa, Fla. provides a data port that may be used to transmit radar data to a local computer (not shown), which then transmits the data to virtual game server 106 to signal a "pitch thrown," and hence, the closing of the prediction window. It is contemplated that a radar gun with integrated communication (e.g. built in WiFi), may be able to communicate with virtual game server 106 without the need for a local computer.

Figure 5:
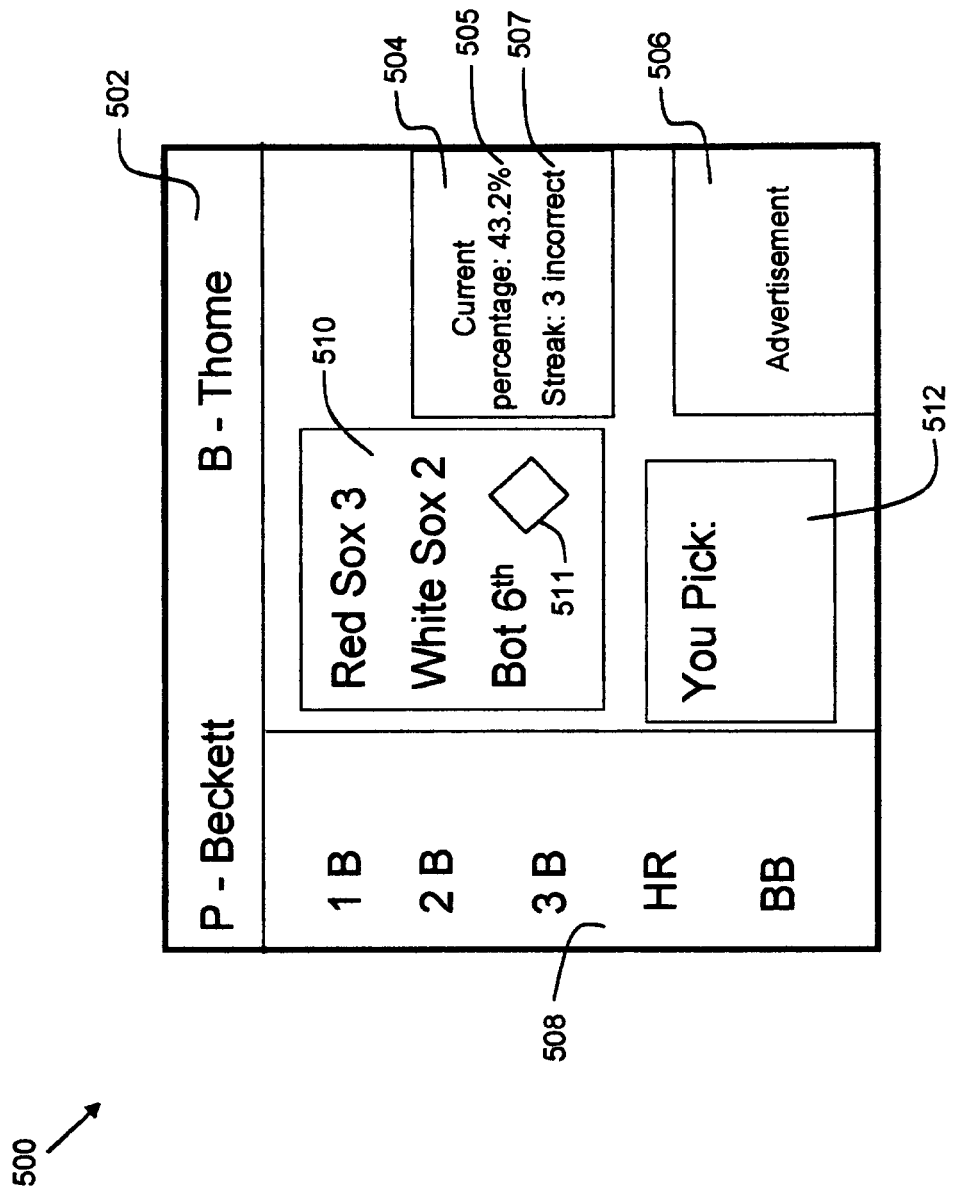
FIGS. 5-9 show embodiments of a client user interface in accordance with various embodiments of the present invention.

FIG. 5 shows an embodiment of a client user interface 500. This is a non-video baseball embodiment, in that no live video is displayed on the user interface. This interface is intended for situations where a live video feed is available (e.g. on the user's television), or when a user is attending the real game and watching it live (e.g. at a stadium). IN this user interface, a contest information window 502 displays information about the current contest. In FIG. 5, the contest information 502 displays information for a pitcher named Beckett, throwing against a batter named Thome. Available outcome window 508 shows a list of available outcomes the user may select. In FIG. 5, the available options shown are single (1B), double (2B), triple (3B), home run (HR), and walk (BB). In one embodiment, additional outcomes may be displayed by invoking a scrolling or paging control (not shown) on the user interface.

Real game information window 510 shows information pertaining to the real game. In FIG. 5, a current score between two baseball teams is shown, along with the current inning. A graphical indication, such as base indication 511, may be used to convey current base runner information.

Virtual game status window 504 shows information pertaining to the virtual game. In the embodiment of FIG. 5, the current percentage of correct predictions 505 for the user is shown, as well as the current streak 507, which conveys how many of the previous outcomes had the same result (correct or incorrect).

Selected outcomes window 512 shows the current outcome (or outcomes) the user has selected as the prediction for the contest indicated in contest display window 502.

Optional advertisement window 506 displays advertisements which may change periodically during play of the virtual game. In one embodiment, the advertisements are targeted, based on user preferences stored in user database 105. In this way, improved advertising revenue is possible. In one contemplated business model, users create an account in order to play the virtual game, and provide some personal preferences or other demographic information which is then used to select advertisements that are most appropriate for that particular user.

Figure 6:
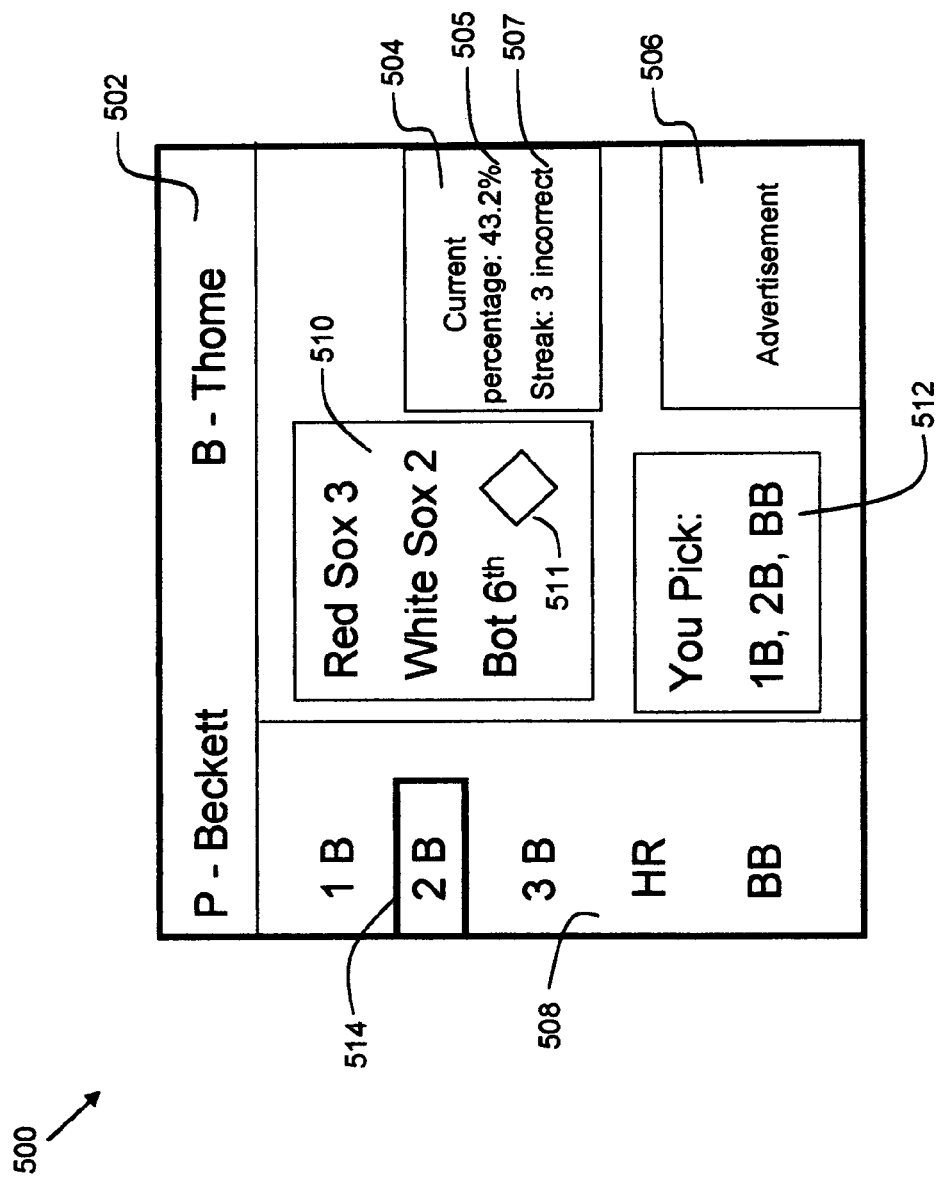

FIG. 6 shows a subsequent step for the embodiment of FIG. 5. In FIG. 6, the Selected outcomes window 512 shows 3 selections (1B, 2B, BB). The user manipulates cursor 514 to highlight a particular selection, and then performs a selection action to place the outcomes in the selected outcomes window. While specifics of the selection means may vary in different embodiments, those skilled in the art will recognize that list manipulation and item selection are well known in the art. Techniques for manipulating lists and selecting items therefrom may include, put are not limited to, a keyboard, mouse, trackball, buttons, and touch screen interface.

Figure 7:
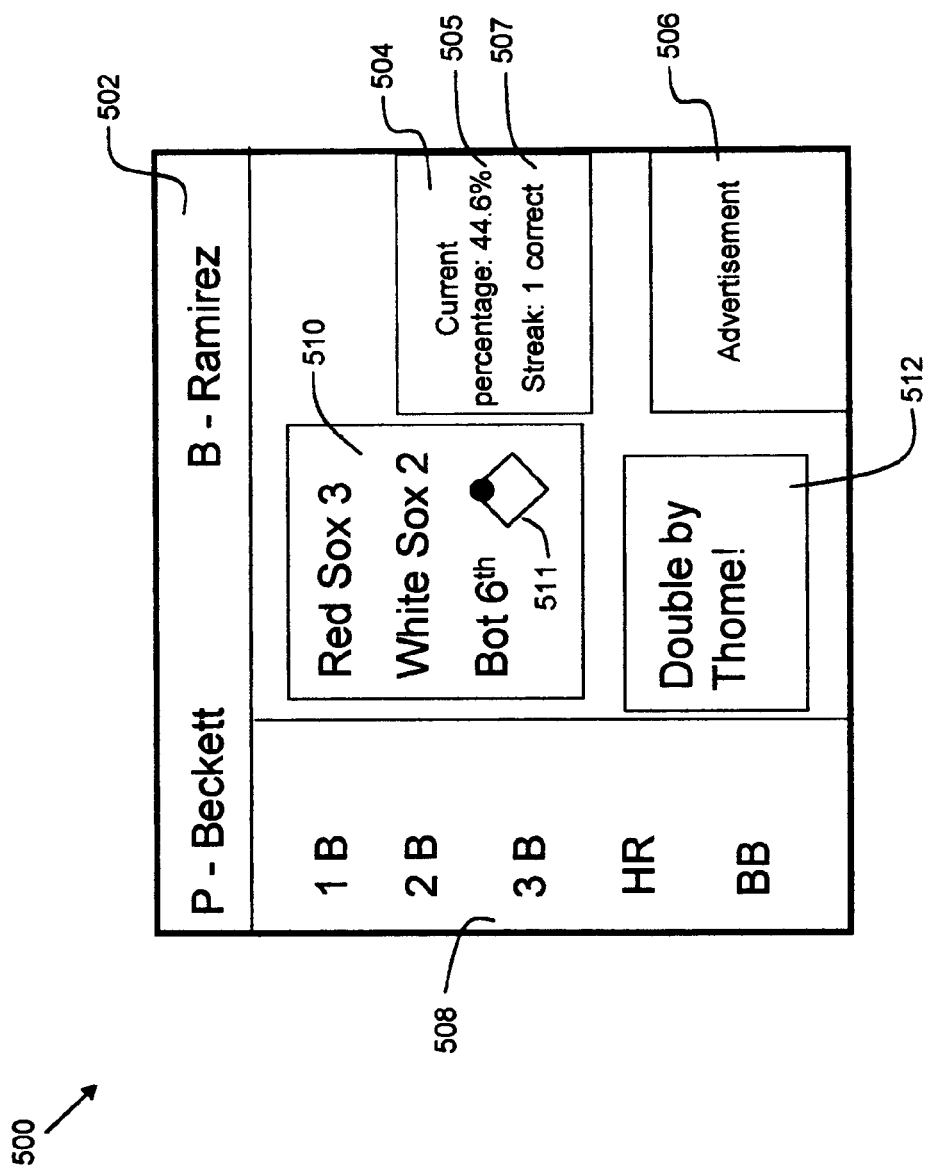

FIG. 7 shows a subsequent step for the embodiment of FIG. 6. In FIG. 7, the result of the contest shown in contest display window 502 in FIG. 5 has now occurred, and is displayed in the selected outcomes window 512. A new contest is displayed in the contest display window 502 of FIG. 7.

Real game information window 510 is updated to show the new information. In this case, as base indication 511 now shows a runner on second base, via the circle image on the second base position of the base indication 511.

Virtual game status window 504 now shows updated information pertaining to the virtual game. In FIG. 7, the current percentage of correct predictions 505 has increased as compared with that shown in FIG. 5, since the user had a double (2B) as one of his predictions, and a double had occurred in the real game. The current streak 507, is updated to indicate one correctly predicted outcome. If the user predicts the next outcome correctly, the current streak 507 will display "2 correct." If the user incorrectly predicts the next outcome, the current streak 507 will display "1 incorrect."

Figure 8:
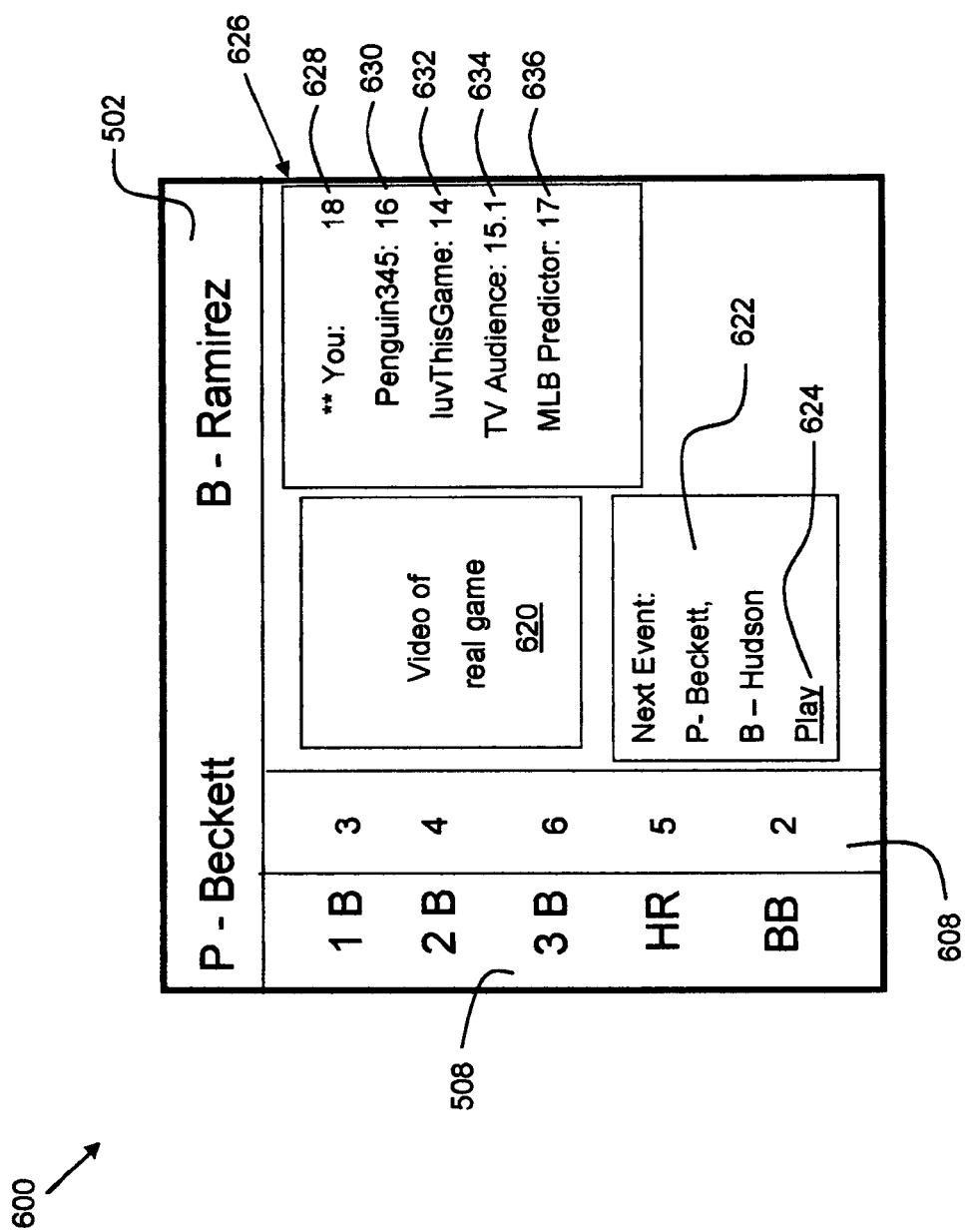

FIG. 8 shows an alternative embodiment of a client user interface 600. This is a real game video baseball embodiment, and comprises real game video display window 620, which shows video of the real game, as the user plays along with the virtual game. For a mobile client 112 or PC client 108, the video delivery can be accomplished via known video streaming techniques such as HTTP or RTSP protocols. For a TV client 110, the video delivery can be through a streaming protocol such as HTTP or RTSP, or via RF through cable, satellite, or terrestrial broadcasting. The user interface 600 also comprises outcome value window 608, which displays point values for each corresponding outcome in available outcome window 508. For example, in FIG. 8, a single has a point value of 3, a double has point value of 4, and triple has a point value of 6, etc. . . . . In this case, a user earns 4 points for correctly predicting a double, and 6 points for correctly predicting a triple. Virtual game status window 626 shows current total points for the user 628, as well as current total points for "friends" 630, and 632. The friends are defined by a user profile stored in user database 105. In one embodiment, a group average 634 is computed and displayed on all participating client devices. In one embodiment, the group on which the group average is computed is a television audience. Virtual game status window 626 may also show the score of an automated predictor 636. In one embodiment, the automated predictor is a computer program executing on virtual game server 106, which generates automatic predictions about the real game. The automated predictor utilizes the information from live game data server 104 and statistics database 102. In an embodiment where the virtual game server 106 is computing a point value (as described in description of FIG. 3), the automated predictor program can use the lowest computed point value as the outcome to predict, since point value is intended to be inversely related to probability of occurrence (that is, the more unlikely the event is, the more points are awarded for correctly guessing that outcome).

Selected outcomes window 622 displays information regarding which outcomes the user selected (similar to as described in description of FIG. 6), and is also used to preview the upcoming contest (in this case, pitcher Beckett vs. batter Hudson). Play button 624 initiates the sequence of the steps for the user to select outcomes for the prediction in selected outcomes window 622. Once the prediction window closes, the play button 624 becomes un-selectable (e.g. "grayed out").

Figure 9:
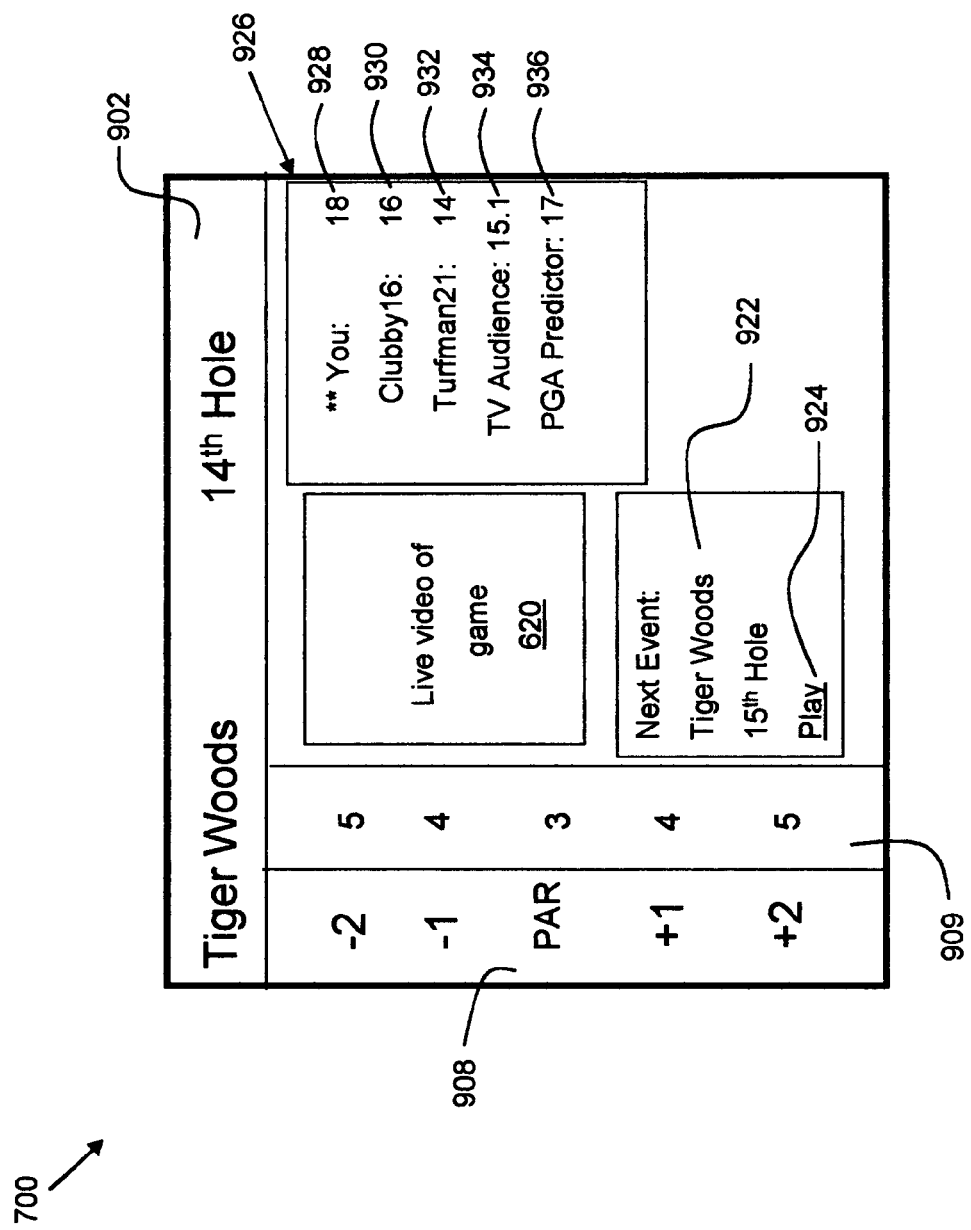

FIG. 9 shows an alternative embodiment of a client user interface 700. This is a real game video golf embodiment, and comprises real game video display window 620, which shows video of the real golf game which corresponds to the virtual game being played. Virtual game status window 926 operates similar to virtual game status window 626, showing current total points for the user 928, as well as current total points for "friends" 930, and 932, group average 934 and the score of an automated predictor 936. Contest information window 902 shows the current contest for which the prediction window is now closed (e.g. Tiger Woods on 14$^{th}$ hole). In the selected outcomes window 922, the upcoming event, for which the prediction window is open, is shown. The user invokes the play button 924 to make predictions, and optionally wager on those predictions, similar to the procedure described for FIGS. 5-8. In this embodiment, pertaining to golf, the available outcomes are different than those for baseball, and comprise the number of strokes that a particular golfer will score on a particular hole on a golf course. These choices are shown in available outcome window 908. The corresponding point value for each outcome is shown in outcome value window 909.

Figure 10:
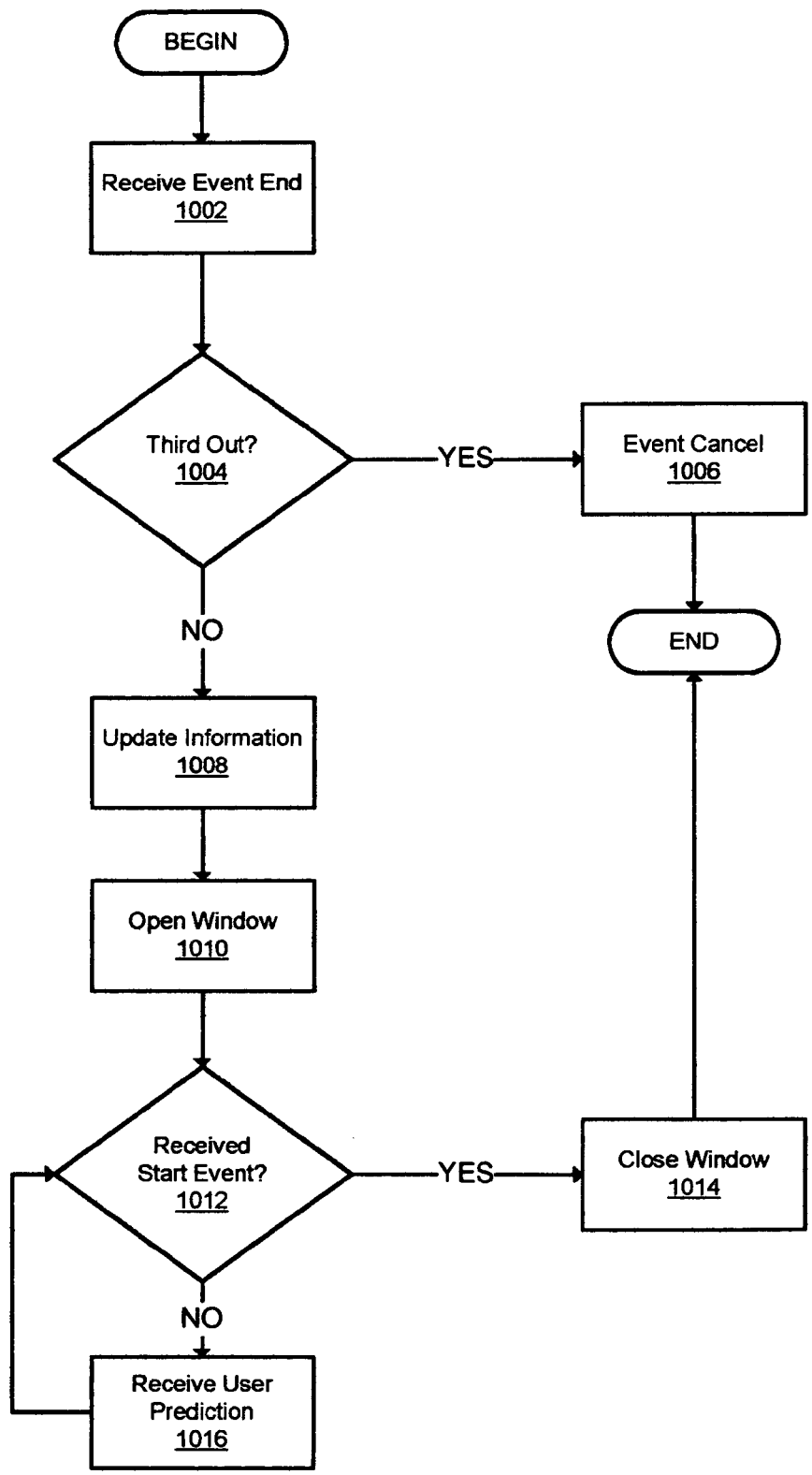
FIG. 10 is a flowchart indicating process steps for determining an event transition.

FIG. 10 is a flowchart indicating process steps for determining an event transition. In step 1002 an event end signal is received. In one embodiment pertaining to baseball, the event end signal is received at the virtual game server 106 from the live game data server 104 whenever an out is made. For other sports, the criteria of an event end will change. For example, in a golf embodiment, the event end signal comprises an indication that a golfer has completed the current hole.

In step 1004, a check is made to see if the third out of the current inning (the criterion for determining if the contest is to be cancelled). If it is the third out, this is an "end event" that requires an event cancellation, since it results in the teams of the real game switching sides, and therefore the contest that was upcoming prior to the third out is cancelled in step 1006. If it is not the third out, user interface information is updated in step 1008. The updated information may include the contest information window 502, real game information window 510, and the virtual game status window 504 (see FIG. 5). In step 1010 the prediction window for the current event opens. At this time, the users can now place predictions on the current contest. In step 1012, a start event is checked for. If a start event has not yet occurred, user predictions are received in step 1016. When a start event occurs (e.g. a signal received from radar gun 420 based on the detection of a pitched ball, or VGO client 216), the prediction window is closed in step 1014, and no further predictions on the current event are accepted by virtual game server 106.

Figure 11:
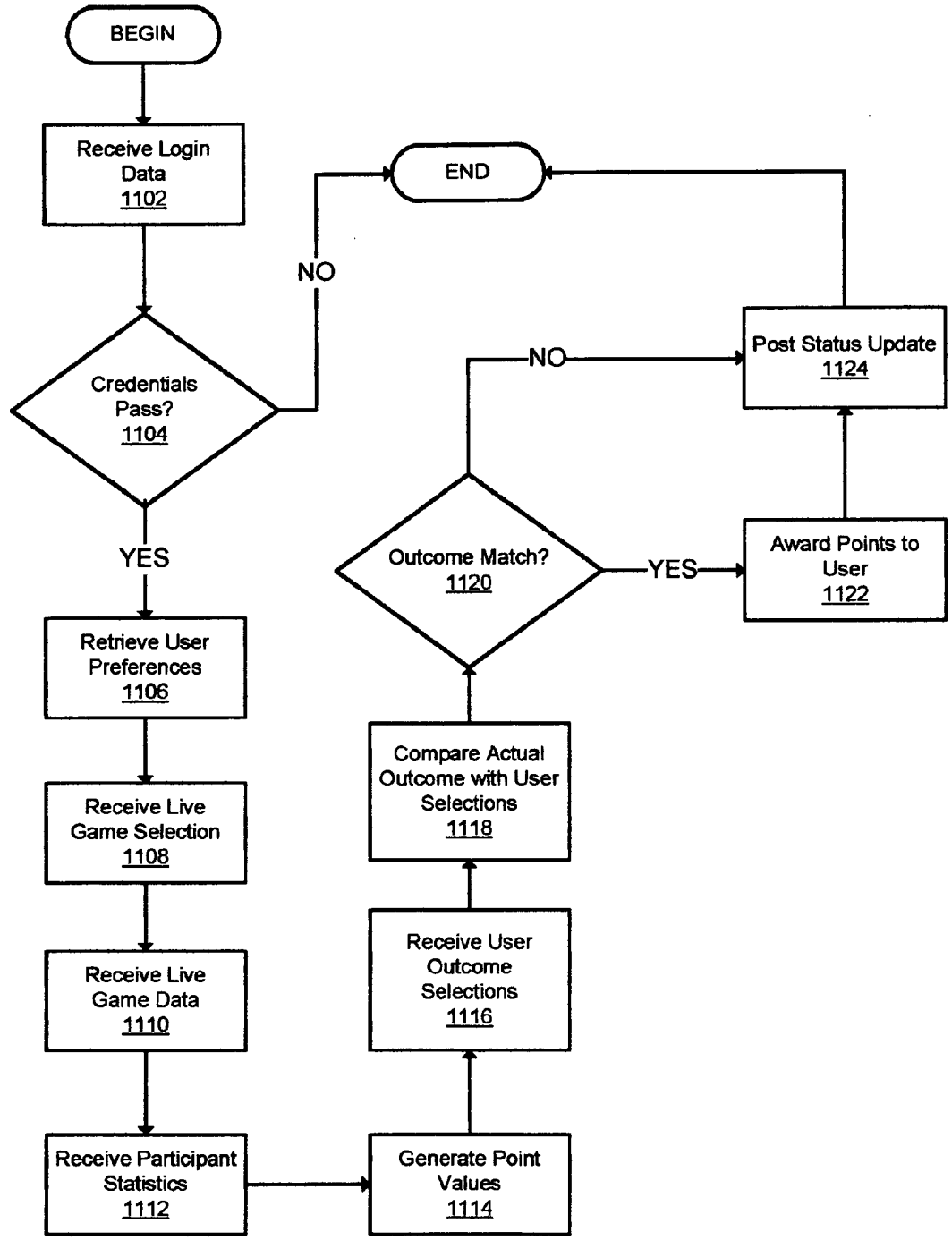
FIG. 11 is a flowchart indicating process steps for user login and play of the virtual game.

FIG. 11 is a flowchart indicating process steps for user login and play of the virtual game. In step 1102, user login is received by the virtual game server 106, if the credentials (e.g. username and password) are incorrect, the login process is terminated. If the login credentials are correct, in step 1106, the user preferences are retrieved from user database 105. In process step 1108, a live game selection is performed, in which the virtual game server receives the desired real game the user wishes to associate with the virtual game. For example, on a given day, there may be 10 baseball games scheduled, and the user selects which of those games he wants to predict, and hence "associate" his virtual game to. Once the real game is selected, the real game data is received in step 1110 (e.g. from live game data server 104). In step 1112 participant (e.g. pitchers, batters, etc. . . . ) statistics are retrieved from the statistics database 102. Based on the statistical data from statistics database 102, and the live game data received at step 110, point values for each available outcome are generated in step 1114. In step 1116 the user's selected predictions are received (e.g. from clients 108, 110, or 112). In step 1118 (one the contest of the real game has transpired), the actual outcome of the contest in the real game is compared with the user selections received in step 1116. In step 1120, the result of the comparison is checked. If the comparison matched (that is, the user made a correct prediction), points are awarded to the user in step 1122. In process step 1124, a status update is posted to all interested clients. The status update includes information such as the current user score. This information is sent to the user's client device (e.g. PC client 108, TV client 110, or mobile client 112). It is optionally sent to other clients, such as those of "friends" of the user, so that the friends can get an update of the user's score (see 630 and 632 of FIG. 6). In this way, the user can enjoy competition with other players of the virtual game that is associated with the same real game the user is watching.

Accordingly, the reader will see that the disclosed game and method of playing provide for an interactive experience that enhances the enjoyment of watching, or listening to, a live sporting event. Although the descriptions above contain specific details, these should not be construed as limiting the scope of the invention, but merely as providing illustrations of some of the presently preferred embodiments of this invention.

What is claimed is:

1. A system comprising:
   a virtual game server;
   a virtual game client device, comprising: a computer comprising a non-transitory computer readable medium comprising machine instructions for communicating with the virtual game server, which when executed by the computer, perform the steps of:
   presenting a plurality of possible outcomes of a live baseball game, wherein the plurality of possible outcomes includes single, double, triple, homerun and walk;
   assigning a point value to each outcome, wherein the point value is inversely related to probability of occurrence;
   presenting a current percentage of correct predictions; and
   managing a prediction window, wherein the prediction window is closed automatically in response to a start event signal received by the virtual game server, wherein the start event signal is automatically generated by a baseball pitcher throwing a pitch, wherein the pitch is detected by a radar gun, and wherein the radar gun is configured and disposed to transmit the start event signal to the virtual game server;

wherein the virtual game server further comprises an automated predictor, the automated predictor configured to receive information from a live game data server and receive information from a statistics database, generate a list of predicted outcomes based on the received information, and assign a point value to each predicted outcome, wherein the point value is inversely related to probability of occurrence, and wherein the automated predictor is further configured to select the predicted outcome from the list of predicted outcomes which has the lowest point value;

wherein the virtual game client is configured and disposed to present a virtual game status window, wherein the virtual game status window is configured and disposed to present a list of player scores, and a score of the automated predictor;

wherein the virtual game client is configured and disposed to display a selected play button, wherein the play button is configured and disposed to be un-selectable in response to the prediction window closing.

* * * * *